(12) United States Patent
Lee

(10) Patent No.: US 7,729,979 B2
(45) Date of Patent: Jun. 1, 2010

(54) SYSTEMS AND METHODS TO FACILITATE ANALYSIS OF A COMMERCIAL MORTGAGE BACKED SECURITY PORTFOLIO BASED ON A CONTRIBUTION OF AN ADDITIONAL MORTGAGE LOAN

(75) Inventor: George H. Lee, New York, NY (US)

(73) Assignee: General Electric Capital Corporation, Stamford, CT (US)

( * ) Notice: Subject to any disclaimer, the term of this patent is extended or adjusted under 35 U.S.C. 154(b) by 2060 days.

(21) Appl. No.: 09/997,640

(22) Filed: Nov. 29, 2001

(65) Prior Publication Data

US 2003/0105708 A1 Jun. 5, 2003

(51) Int. Cl.
*G06Q 40/00* (2006.01)
(52) U.S. Cl. .............................. 705/38; 705/37; 705/39; 705/40; 705/35; 705/31; 705/4; 705/36 R
(58) Field of Classification Search .............. 705/35–45
See application file for complete search history.

(56) References Cited

U.S. PATENT DOCUMENTS 5,893,079 A    4/1999   Cwenar
5,966,700 A    10/1999  Gould et al.
6,058,377 A    5/2000   Traub et al.
6,249,775 B1 * 6/2001   Freeman et al. ............... 705/35

OTHER PUBLICATIONS

Wheatworks—(Version History: LoanSpread Financial Calculator, at http://www.wheatworks.com/versionhistorylscp.htm).*
Wheatworks—(Version History: LoanSpread Financial Calculator, at http://www.wheatworks.com/versionhistorylscp.htm, 1997).*
Concept Release: Rating Agencies and the Use of Credit Ratings under the Federal Securities Laws (Charles D. Brown, Jul. 28, 2003).*

* cited by examiner

*Primary Examiner*—Calvin Loyd Hewitt, II
*Assistant Examiner*—Cristina Owen Sherr
(74) *Attorney, Agent, or Firm*—Buckley, Maschoff & Talwalkar LLC

(57) ABSTRACT

Systems and methods are provided to facilitate an analysis of a commercial mortgage backed security portfolio. According to one embodiment, base information associated with the portfolio is determined. Information associated with an additional mortgage loan to be added to the portfolio is then determined, and a loan spread is calculated for the additional mortgage loan in accordance with a contribution of the additional mortgage loan to the portfolio. For example, a real time pricing server may calculate the loan spread based on a desired profitability associated with the additional mortgage loan.

22 Claims, 14 Drawing Sheets

1000

| MORTGAGE LOAN IDENTIFIER 1002 | MORTGAGE LOAN STATUS 1004 |
|---|---|
| ML-1001 | EXISTING |
| ML-1006 | EXISTING |
| ML-1017 | EXISTING |
| ML-1022 | EXISTING |
| ML-1025 | EXISTING |
| ML-1032 | ADDITIONAL |

| MARKET INFORMATION IDENTIFIER 1102 | MARKET INFORMATION DESCRIPTION 1104 | MARKET INFORMATION 1106 |
|---|---|---|
| MI-01 (1032) | DATE | 2/4/2003 |
| MI-02 (1032) | TREASURY | 1Y - 5.92; 2Y - 5.92; 10Y - 5.84 ... |
| MI-03 (1032) | SWAPS | 5Y - 94.13; 10Y - 119 |
| MI-04 (1032) | LIBOR | 1MO - 6.18; 3MO - 6.28 |
| MI-05 (1032) | SPREADS | AAA-S (L+30); AAA-L (L+38); ... |
| MI-06 (1032) | IMPLIED YIELDS | NR - 28.50% |

FIG. 11

| PROPERTY TYPE 1202 | DSCR 1204 | TERMS TO COMPUTE 1206 | CREDIT RATING CATEGORY AND SIZE 1208 | | | | | | |
|---|---|---|---|---|---|---|---|---|---|
| | | | AAA | AA | A | BBB | BB | B | UR |
| MULTIFAMILY | 1.20 | 5, 7, 10 Y; 30 Y AMORT. | 74.15 | 5.12 | 4.54 | 3.23 | 2.51 | 1.03 | 2.29 |
| MULTIFAMILY | 1.25 | 5, 7, 10 Y; 30 Y AMORT. | 76.55 | 4.64 | 4.12 | 2.93 | 2.29 | 0.94 | 2.08 |
| HOTEL | 1.35 | 5, 7, 10 Y; 25 Y AMORT. | 64.55 | 7.04 | 6.22 | 4.43 | 3.41 | 1.42 | 3.16 |
| HOTEL | 1.40 | 5, 7, 10 Y; 25 Y AMORT. | 67.75 | 6.40 | 5.66 | 4.03 | 3.11 | 1.29 | 2.87 |
| ANCHORED RETAIL | 1.25 | 5, 7, 10 Y; 30 Y AMORT. | 74.15 | 5.12 | 4.54 | 3.23 | 2.51 | 1.03 | 2.29 |
| ANCHORED RETAIL | 1.30 | 5, 7, 10 Y; 30 Y AMORT. | 77.35 | 4.48 | 3.98 | 2.83 | 2.21 | 0.90 | 2.01 |
| INDUSTRIAL | 1.40 | 5, 7, 10 Y; 30 Y AMORT. | 77.35 | 4.48 | 3.98 | 2.83 | 2.21 | 0.90 | 2.01 |
| INDUSTRIAL | 1.60 | 5, 7, 10 Y; 30 Y AMORT. | 78.95 | 4.16 | 3.70 | 2.63 | 2.06 | 0.84 | 1.87 |

SYSTEMS AND METHODS TO FACILITATE ANALYSIS OF A COMMERCIAL MORTGAGE BACKED SECURITY PORTFOLIO BASED ON A CONTRIBUTION OF AN ADDITIONAL MORTGAGE LOAN

FIELD

The present invention relates to commercial mortgage backed security portfolios. In particular, the present invention relates to systems and methods to facilitate analysis of a commercial mortgage backed security portfolio based on a contribution of an additional mortgage loan.

BACKGROUND

A Commercial Mortgage Backed Security (CMBS) is a bond or other financial obligation associated with a pool or "portfolio" of mortgage loans secured by commercial assets (e.g., a hotel or office building). A CMBS portfolio is typically divided into a number of different credit rating categories, with certain categories being, by design, less likely to suffer defaults (e.g., a CMBS portfolio may have a less risky "AAA" category and a more risky "AA" category). Each of these credit rating categories is associated with a category size. For example, a CMBS portfolio may have a "AAA" credit rating category with a size of 75% (i.e., 75% of the total portfolio assets are in the "AAA" category), a "AA" category with a size of 15%, and a "A" category with a size of 10%.

Note that different credit rating categories may be associated with a different loan "spreads" representing the difference between an interest rate paid to investors and a known index (e.g., a number of basis points between the interest rate paid to investors and the rate currently associated with, for example, a ten year US treasury note). A less risky credit rating category will generally have a lower loan spread while a more risky category will have a higher loan spread.

Each loan in the CMBS portfolio is also associated with a loan spread, with a higher loan spread indicating a higher profitability of the loan. When creating a CMBS portfolio, the value or profitability of a loan that might be added to the portfolio is often of interest. That is, the loan spread that will be required to produce a desired level of profitability may need to be determined. Because CMBS portfolios can be associated with a significant amount of capital (e.g., $800 MM), an accurate and timely determination of this information is important.

This type of calculation, however, can be very complex (e.g., because different loans that might be added to a CMBS portfolio may effect the overall credit rating category sizes in different ways) and time consuming. Unfortunately, the calculation may need to be performed frequently (e.g., on a daily basis) because some of the variables that effect the relationship between the loan spread and the profitability of the loan constantly change (e.g., treasury rates, investor opinions, and competition in the CMBS market). Moreover, the calculation may need to be performed for a significant number of different property types (e.g., associated with different commercial assets securing additional loans) and risk parameters (e.g., debt service coverage ratio information and loan to value information). All of these factors can make the accurate and timely determination of an appropriate loan spread difficult.

SUMMARY

To alleviate problems inherent in the prior art, the present invention introduces systems and methods to facilitate analysis of a CMBS portfolio based on a contribution of an additional mortgage loan.

According to one embodiment, base information is determined for a CMBS portfolio having a plurality of mortgage loans. Information associated with an additional mortgage loan to be added to the portfolio is also determined, and a loan spread is calculated for the additional mortgage loan in accordance with a contribution of the additional mortgage loan to the portfolio.

Another embodiment is directed to a computer-implemented method for facilitating analysis of a CMBS portfolio. The portfolio is associated with a plurality of mortgage loans and a plurality of credit rating categories, with each credit rating category being associated with a current category size. According to this embodiment, base information associated with the portfolio is determined. Information associated with an additional mortgage loan to be added to the portfolio is also determined, including a desired profitability of the additional mortgage loan. For the additional mortgage loan, a category size is determined based a property type, a risk value, debt service coverage ratio information, and/or loan to value information. The category size for the additional mortgage loan is added to the current category size to determine a combined category size for each rating category. An original profitability of the portfolio is determined, and a combined profitability of the portfolio and the additional mortgage loan is calculated based on the combined category sizes. The original profitability is then subtracted from the combined profitability to determine a profitability of the additional mortgage loan. A loan spread for the additional mortgage loan can then be calculated in accordance with a contribution of the additional mortgage loan to the portfolio. The calculation of the loan spread is an iterative process wherein a trial loan spread for the additional mortgage loan is determined. A resulting profitability is then computed based on the trial spread, and the trial loan spread may be adjusted based on a duration of the additional mortgage loan. This computing and adjusting are then repeated until the resulting profitability is within a predetermined range of the desired profitability.

According to still another embodiment, base information is determined for a CMBS portfolio having a plurality of mortgage loans. Information associated with an additional mortgage loan to be added to the portfolio is also determined, and a profitability of the additional mortgage loan is calculated in accordance with a contribution of the additional mortgage loan to the portfolio.

One embodiment comprises: means for determining base information associated with a CMBS portfolio having a plurality of mortgage loans; means for determining information associated with an additional mortgage loan to be added to the portfolio; and means for calculating a loan spread for the additional mortgage loan in accordance with a contribution of the additional mortgage loan to the portfolio.

Still another embodiment comprises means for facilitating analysis of a CMBS portfolio associated with a plurality of mortgage loans and a plurality of credit rating categories, each credit rating category being associated with a current category size. In particular, the embodiment comprises: means for determining base information associated with the CMBS portfolio; means for determining information associated with an additional mortgage loan to be added to the portfolio, including a desired profitability of the additional mortgage loan; means for determining, for the additional mortgage loan, a category size for each rating category based on at least one of: (i) a property type, (ii) a risk value, (iii) debt service coverage ratio information, and (iv) loan to value information; means for adding the category size for the additional mortgage loan to the current category size to determine a combined category size for each rating category; means for determining an original profitability of the portfolio; means for calculating a combined profitability of the portfolio and the additional mortgage loan based on the combined category sizes; means for subtracting the original profitability from the combined profitability to determine a profitability of the additional mortgage loan; and means for calculating a loan spread for the additional mortgage loan in accordance with a contribution of the additional mortgage loan to the portfolio, wherein the calculation of the loan spread is an iterative process, comprising: determining a trial loan spread for the additional mortgage loan, computing a resulting profitability based on the trial spread, and adjusting the trial loan spread based on a duration of the additional mortgage loan, wherein said computing and adjusting are repeated until the resulting profitability is within a predetermined range of the desired profitability.

Yet another embodiment comprises: means for determining base information associated with a CMBS portfolio having a plurality of mortgage loans; means for determining information associated with an additional mortgage loan to be added to the portfolio; and means for calculating a profitability of the additional mortgage loan in accordance with a contribution of the additional mortgage loan to the portfolio.

A technical effect of some embodiments of the present invention is to provide a computer adapted to efficiently facilitate analysis of CMBS portfolios and mortgage loans.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 10 is a tabular representation of a portion of a portfolio database according to an embodiment of the present invention.

FIG. 11 is a tabular representation of a portion of a market information database according to an embodiment of the present invention.

DETAILED DESCRIPTION

Embodiments of the present invention are directed to systems and methods to facilitate analysis of a CMBS portfolio based on a contribution of an additional mortgage loan.

Portfolio Analysis System

Figure 1:
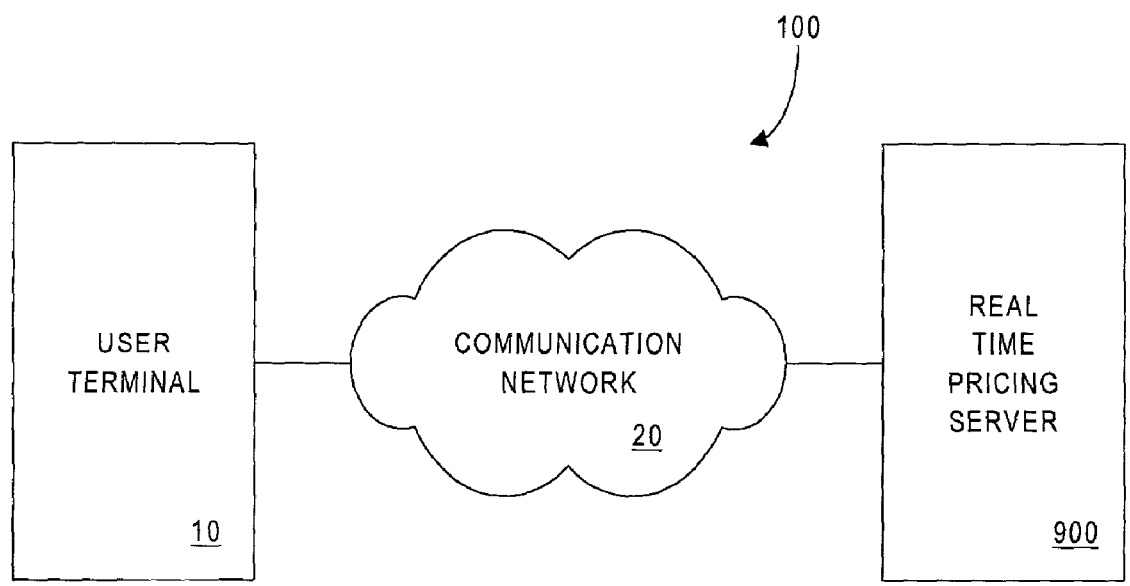
FIG. 1 is a block diagram of a portfolio analysis system according to some embodiments of the present invention.

Turning now in detail to the drawings, FIG. 1 is a block diagram of a portfolio analysis system 100 according to some embodiments of the present invention. The portfolio analysis system 100 includes a real time pricing server 900 in communication with a user terminal 10 through a communication network 20. The communication network 20 may comprise, for example, a Local Area Network (LAN), a Metropolitan Area Network (MAN), a Wide Area Network (WAN), a proprietary network, a Public Switched Telephone Network (PSTN), a Wireless Application Protocol (WAP) network, or an Internet Protocol (IP) network such as the Internet, an intranet or an extranet.

The real time pricing server 900 and the user terminal 10 may be any devices capable of performing the various functions described herein. The real time pricing server 900 may be, for example, a Web server adapted to perform calculations and provide results in a substantially real-time fashion. The user terminal 10 may be, for example, a Personal Computer (PC) adapted to run a Web browser application (e.g., the INTERNET EXPLORER® application available from MICROSOFT®), a portable computing device such as a laptop computer or a Personal Digital Assistant (PDA), and/or a wireless telephone.

Note that the devices shown in FIG. 1 need not be in constant communication. For example, the real time pricing server 900 may communicate with the user terminal 10 on an as-needed or periodic basis. Moreover, although a single real time pricing server 900 and user terminal 10 are shown in FIG. 1, any number of these devices may be included in the portfolio analysis system 100. Similarly, a single device may act as both a real time pricing server 900 and a user terminal 10.

Figure 2:
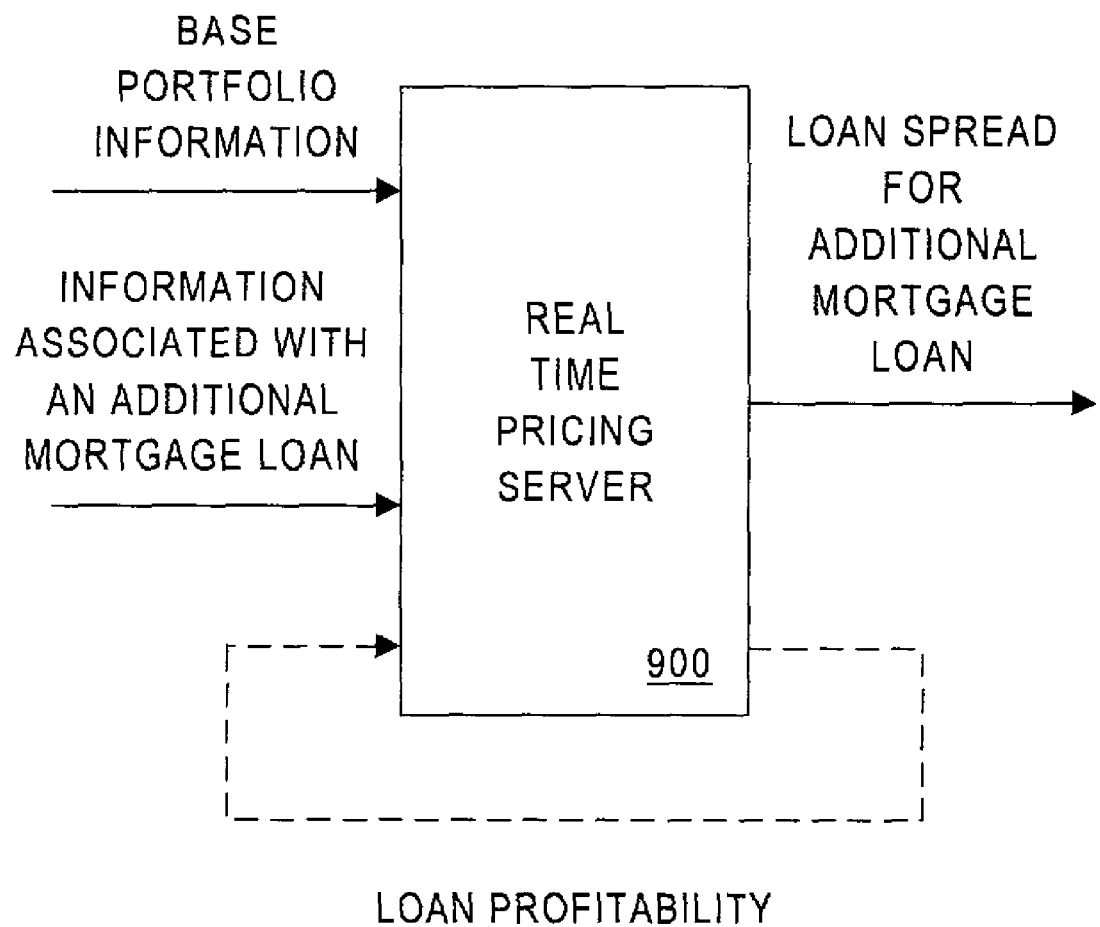
FIG. 2 is an information flow diagram according to some embodiments of the present invention.

According an embodiment of the present invention, the real time pricing server 900 facilitates analysis of a CMBS portfolio. In particular, FIG. 2 is an information flow diagram according to some embodiments of the present invention. As can be seen, the real time pricing server 900 may receive base portfolio information along with information associated with an additional mortgage loan to be added to the portfolio. The real time pricing server 900 then provides a loan spread for the additional mortgage loan in accordance with a contribution of the additional mortgage loan to the portfolio. Moreover, the real time pricing server 900 may calculate and provide loan profitability information which, in turn, may be used by the real time pricing server 900 (e.g., in an iterative fashion).

Portfolio Analysis Methods

Figure 3:
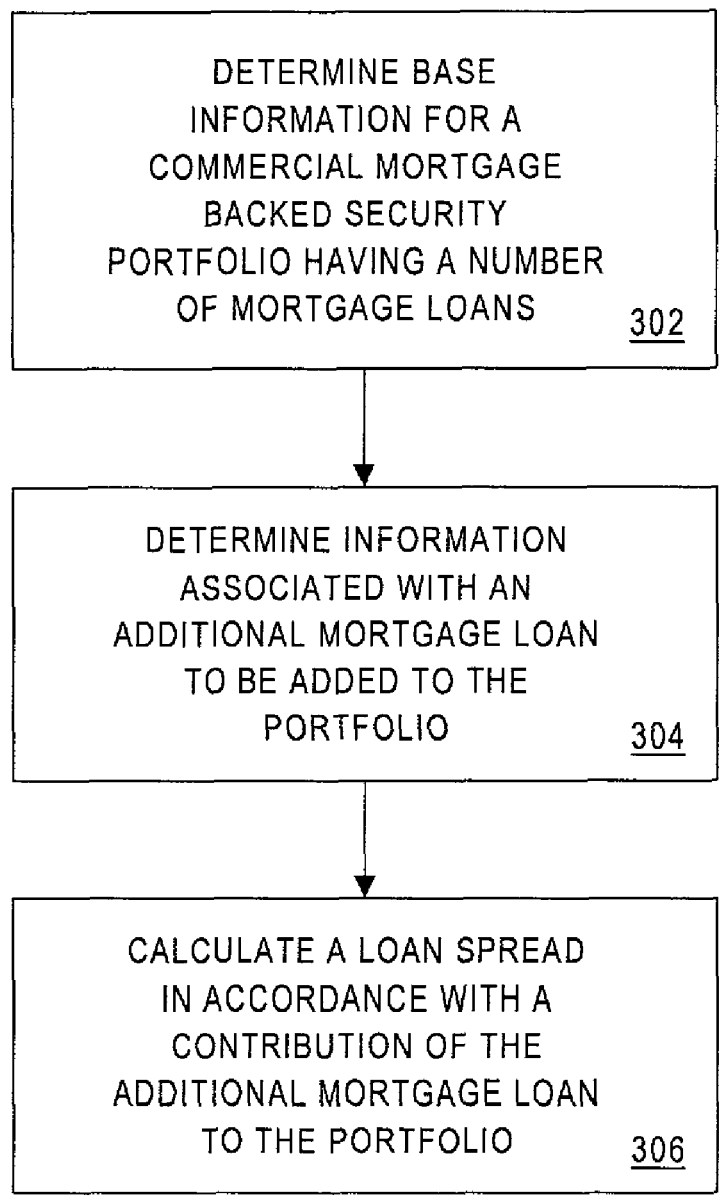
FIG. 3 is a flow chart of a method according to some embodiments of the present invention.

FIG. 3 is a flow chart of a method that may be performed by the real time pricing server 900 according to some embodiments of the present invention. The flow charts in FIG. 3 and the other figures described herein do not imply a fixed order to the steps, and embodiments of the present invention can be practiced in any order that is practicable.

At 302, base information associated with a portfolio is determined. The base information may include, for example: balance information, loan rate information, loan term information, remaining term information, amortization term information, servicing fee information, payment basis information, payment basis servicing fee information, and/or a calculation of interest reserve information. Note that the real time pricing server 900 may "determine" the base information by receiving the information from another source. For example, according to one embodiment, the real time pricing server 900 retrieves the base information from a database or an associated system. Some of the base information may also be generated in accordance with a function library adapted to generate loan and/or CMBS cash flows, such as the TREP-PENGINE™ set of C-function library subroutines available from TREPP LLC.

Figure 4:
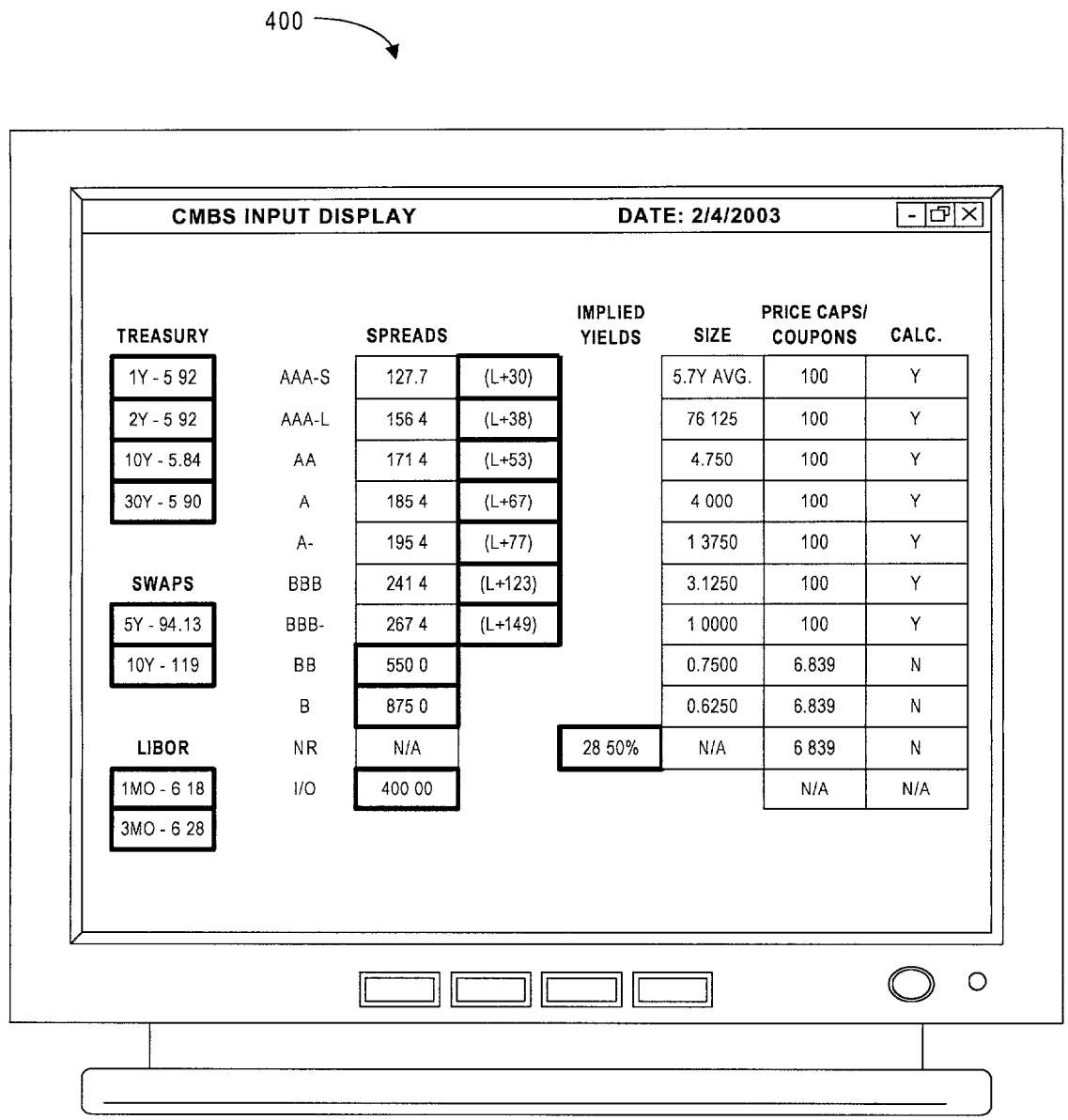
FIG. 4 illustrates an input display according to an embodiment of the present invention.

At 304, information associated with an additional mortgage loan to be added to the portfolio is determined. According to one embodiment, the real time pricing server 900 receives information associated with the additional mortgage loan from the user terminal 10 via the input display 400 illustrated in FIG. 4. As can be seen in FIG. 4, such information may include, for example, treasury information (e.g., interest rates), swap information, and London Inter Bank Offer Rate (LIBOR) information.

Note that the additional mortgage loan may be associated with a plurality of credit rating categories (e.g., AAA, AA, and A), and each credit rating category may be associated with a loan spread (e.g., a basis points value). For example, as shown in FIG. 4, the user has indicated that the additional loan's "AA" credit rating category will have a spread of "171.4"

Each credit rating category is also associated with a category "size" (e.g., expressed as a percentage of the total loan). Note that the values illustrated in FIG. 4 are for illustration purposes only (e.g., the sum of the category sizes may equal "100" in an actual input display 400). According to one embodiment, the real time pricing server 900 determines category sizes for the additional mortgage loan based on a property type (e.g., a "hotel" or an "industrial" property type) and/or a risk value associated with the loan (e.g., debt service coverage ratio information or loan to value information). For example, the real time pricing server 900 may retrieve appropriate category sizes from a contributory bond sizes database (described with respect to FIG. 12) in accordance with a rating agency model.

Other information may also be provided via the input display 400, including, for example, price cap information and coupon information for each credit rating category. Similarly, a user may indicated whether or not a particular credit rating category will be calculated.

At 306, a loan spread is calculated for the additional mortgage loan in accordance with a contribution of the additional mortgage loan to the portfolio. According to one embodiment, the real time pricing server 900 initially determines an original profitability of the portfolio based on the portfolio's current credit rating category sizes (e.g., without the additional loan).

The real time pricing server 900 may then add the category size associated with the additional mortgage loan to the current category size to determine a combined category size for each credit rating category. For example, Table I illustrates current category sizes, additional loan category sizes and combined category sizes for a portfolio having a base collateral of $800 MM and an additional multi-family property type loan having a debt service coverage ratio of 1.2 and a size of $6.5 MM.

TABLE I

Illustration of Combined Category Sizes

| Credit Rating Category | Current Category Size | Additional Loan Category Sizes | Combined Category Sizes |
|---|---|---|---|
| AAA-L | 76.125 | 74.14 | 76.1091 |
| AA | 4.750 | 5.12 | 4.7530 |
| A | 4.00 | 4.54 | 4.0044 |
| A− | 1.375 | 1.32 | 1.3746 |
| BBB | 3.125 | 3.23 | 3.1258 |
| BBB− | 1.000 | 1.28 | 1.0023 |
| BB+ | 3.875 | 1.83 | 3.8585 |
| BB | 0.750 | 2.51 | 0.7642 |
| BB− | 0.750 | 1.00 | 0.7520 |
| B+ | 0.375 | 1.04 | 0.3803 |
| B | 0.625 | 1.03 | 0.6283 |
| B− | 0.650 | 0.66 | 0.6500 |
| NR | 2.600 | 2.29 | 2.5975 |

A combined profitability of the portfolio and the additional mortgage loan is then calculated based on the combined category sizes, and the real time pricing server 900 subtracts the original profitability from the combined profitability to determine a profitability of the additional mortgage loan as illustrated in Table II.

TABLE II

Illustration of Profitability Calculation

| | Original Portfolio | Original Portfolio Plus Additional Loan | Additional Loan |
|---|---|---|---|
| Flat Proceeds | $820,000,000 | $826,565,000 | $6,565,000 |
| Collateral | $800,000,000 | $806,500,000 | $6,500,000 |
| Net | 20,000,000 | 20,065,000 | 65,000 |
| | 2.50% | 2.49% | 1.00% |

Note that this calculation may be performed for a number of different original term periods (e.g., 5, 7, and 10 year original term periods).

According to one embodiment, the information associated with the additional mortgage loan includes one or more desired profitability values (or "arbitrage targets") of the additional mortgage loan. For example, the real time pricing server 900 may determine loan spreads for the additional mortgage loan based on desired profitability values of 0.75%, 1.00%, and 1.25%.

Note that the calculation of the loan spread may be an iterative process. For example, the real time pricing server 900 may determine a "trial" loan spread for the additional mortgage loan. A resulting profitability may then be calculated for the additional loan based on this trial loan spread. If the profitability is within a predetermined range of the desired profitability, the process ends. That is, the real time pricing server 900 has found the appropriate loan spread (e.g., the trial loan spread) that will result in the desired profitability for the additional mortgage loan.

If, however, the profitability calculated based on the trial loan spread is not within a predetermined range of the desired profitability, the real time pricing server 900 may adjust the trial loan spread and repeat the profitability calculation (i.e., using the adjusted loan spread). This process may be repeated until the resulting profitability is within the predetermined range of the desired profitability.

According to one embodiment, the real time pricing server 900 adjusts the trial loan spread based on a duration of the additional mortgage loan. For example, an original duration of the portfolio may be determined (e.g., without the additional mortgage loan) and a combined duration of the portfolio and the additional mortgage loan may be calculated. The real time pricing server 900 may then subtract the original duration from the combined duration to determine the duration of the additional mortgage loan as illustrated in Table III.

TABLE III

| | Illustration of Duration Calculation | | |
|---|---|---|---|
| | Original Portfolio | Original Portfolio Plus Additional Loan | Additional Loan |
| Collateral | $800,000,000 | $806,500,000 | $6,500,000 |
| Duration | 6.461 | 6.460 | 6.34 |

In this case, the duration of the additional mortgage loan may be used to estimate an adjustment to the trial loan spread. For example, if the duration of the additional mortgage loan is 6.34, the basis points change per percentage point would be 15.78 (i.e., taking the reciprocal of the duration).

Figure 5:
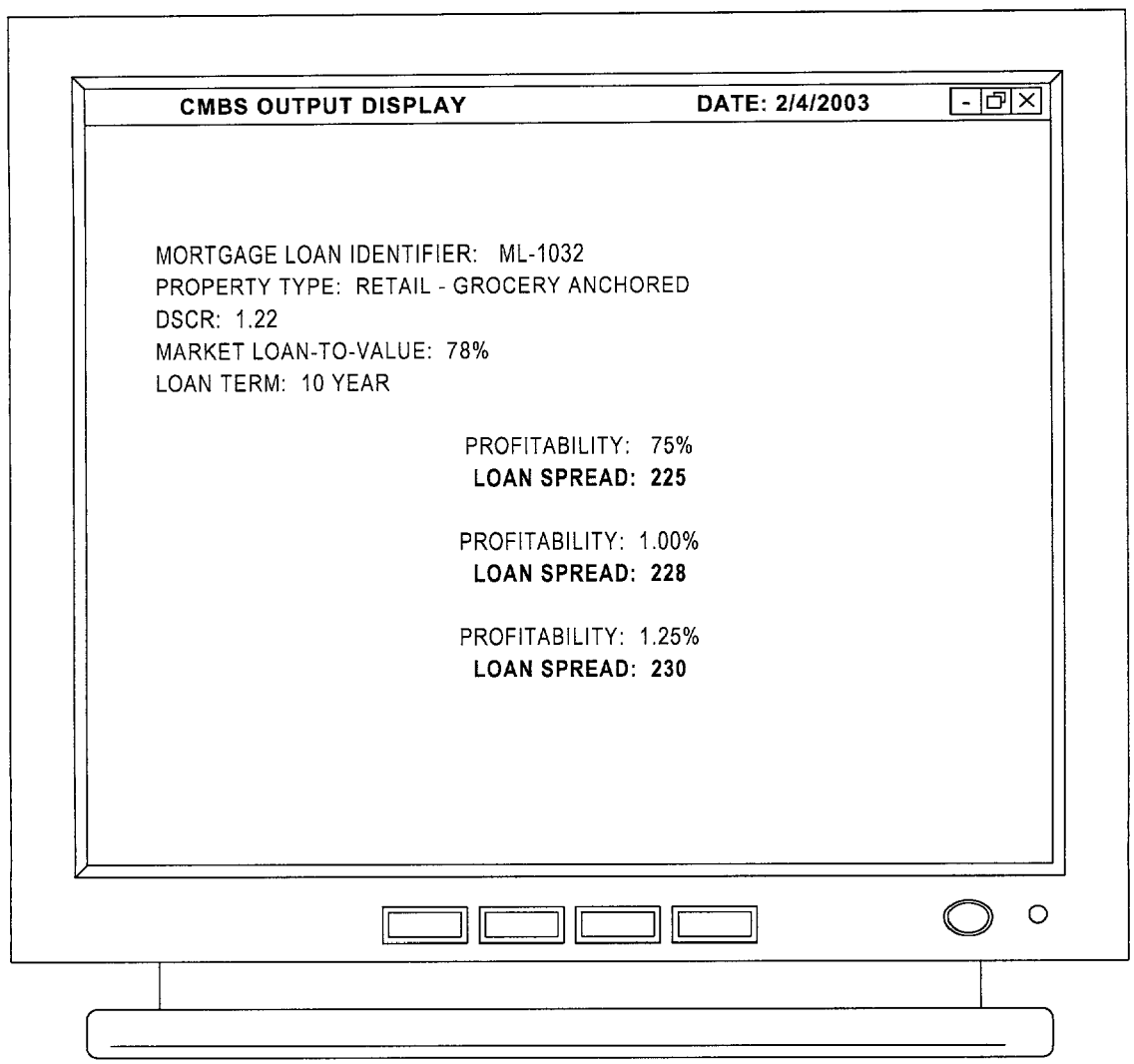
FIG. 5 illustrates an output display according to an embodiment of the present invention.

As result of the iterative process described above, the real time pricing server 900 may generate individual loan pricing outputs expressed as spread values in accordance with profitability targets. For example, FIG. 5 illustrates an output display 500 according to an embodiment of the present invention. As can be seen, if a profitability of 0.75% is desired, the loan spread for the additional mortgage loan should be "225." Similarly, loan spreads of "228" and "230" are appropriate for desired profitability values of 1.00% and 1.25%, respectively.

Figure 6:
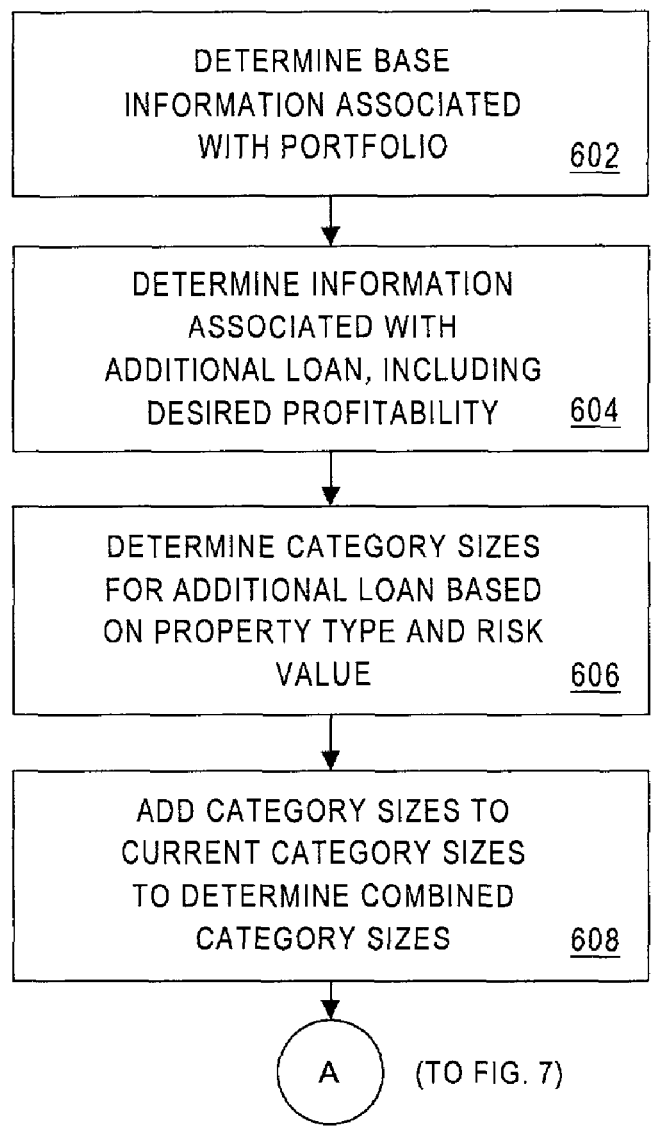
FIGS. 6 and 7 are a flow chart of a method according to another embodiment of the present invention.
Figure 7:
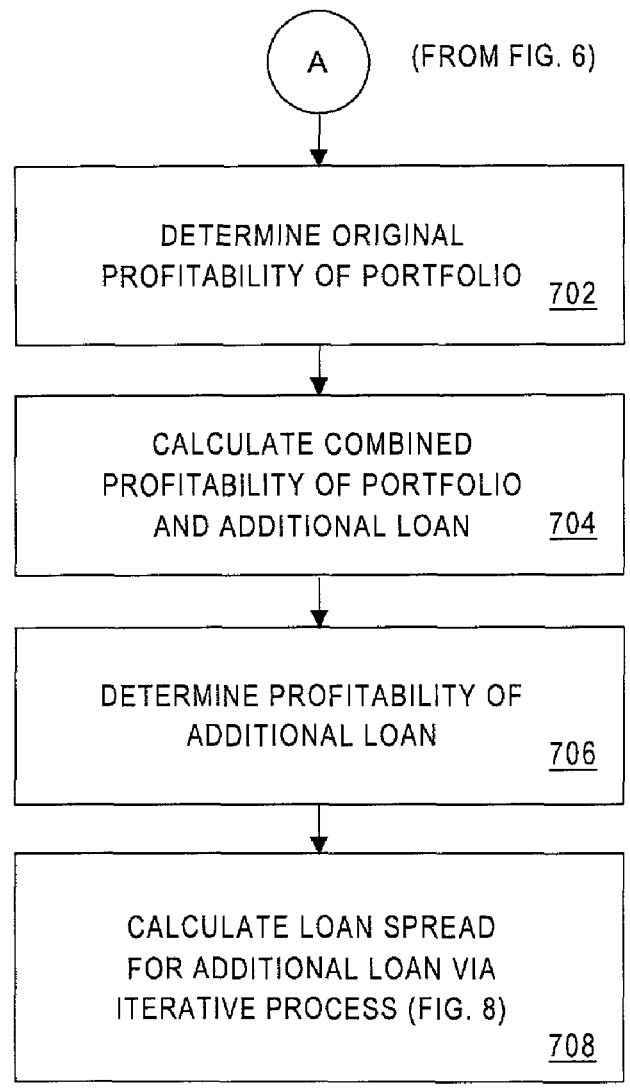

FIGS. 6 and 7 are a flow chart of a method according to another embodiment of the present invention. In particular, the flow chart illustrates a computer-implemented method to facilitate analysis of a CMBS portfolio associated with a plurality of mortgage loans. The method may be performed, for example, by the real time pricing server 900 and/or a user terminal 10.

At 602, base information associated with the portfolio is determined. For example, the real time pricing server 900 may determine balance information, loan rate information, original term information (e.g., 60, 84, or 120 months), remaining term information, amortization term information (e.g., 300 or 360 months), servicing fee information (e.g., 0.075), payment basis information, payment basis servicing fee information, and/or a calculation of interest reserve information. The real time pricing server 900 may determine this information via, for example, a database, an associated system, and/or a function library (e.g., the TREPPENGINE™). The base information may also include the current sizes of a number of different credit rating categories.

At 604, information associated with an additional mortgage loan to be added to the portfolio is determined. For example, the real time pricing server 900 may receive some or all of the following information from the user terminal 10: treasury information (e.g., interest rates), swap information, and London Inter Bank Offer Rate (LIBOR) information. According to this embodiment, the information associated with the additional loan includes at least one desired profitability of the additional mortgage loan (e.g., an arbitrage target expressed as a percent of balance).

The additional mortgage loan is associated with a plurality of credit rating categories (e.g., AAA, AA, and A), and each credit rating category may be associated with a loan spread (e.g., a basis points value). Other information may also be determined on a credit rating category basis, such as price cap information, coupon information, and/or an indication of whether or not a particular credit rating category will be calculated.

Each credit rating category is also associated with a category "size" (e.g., expressed as a percentage of the total loan). At 606, the real time pricing server 900 determines category sizes for the additional mortgage loan based on a property type (e.g., a "hotel" or an "industrial" property type) and/or a risk value associated with the loan (e.g., debt service coverage ratio information and/or loan to value information). For example, the real time pricing server 900 may retrieve appropriate category sizes from a contributory bond sizes database (described with respect to FIG. 12).

At 608, the real time pricing server 900 adds the category size for the additional mortgage loan to the current category size to determine a combined category size for each rating category. Note that when the current category size is expressed as a percentage value of the original portfolio and the additional loan category size is expressed as a percentage value of the additional loan, the relative sizes of the portfolio and the additional loan is needed to calculated the combined category sizes (e.g., the contribution of the additional loan is weighted).

Referring now to FIG. 7, an original profitability of the portfolio is determined at 702. That is, the real time pricing server 900 determines the profitability of the original portfolio without considering the additional mortgage loan.

At 704, the combined profitability of the portfolio and the additional mortgage loan is determined by the real time pricing server 900 in accordance with on the combined category sizes. Thus, the profitability of the additional mortgage loan may be determined at 706 via a method of subtraction process. That is, the original profitability may be subtracted from the combined profitability to determine a profitability of the additional mortgage loan.

Figure 8:
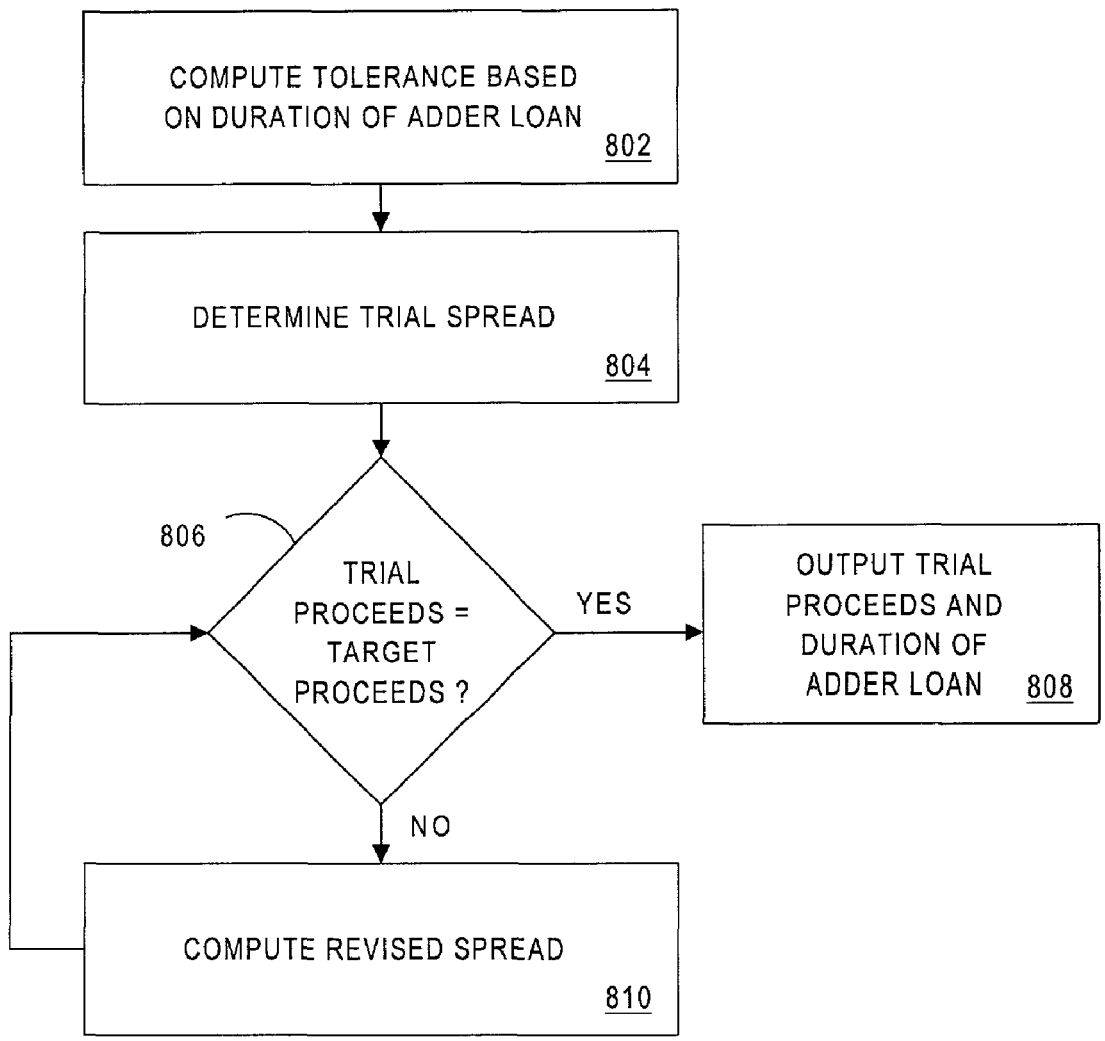
FIG. 8 is a flow chart of an iterative process according to one embodiment of the present invention.

At 708, the real time pricing server 900 calculates a loan spread for the additional mortgage loan in accordance with a contribution of the additional mortgage loan to the portfolio, wherein the calculation of the loan spread is an iterative process. This iterative process will now be described with respect to FIG. 8. Note that the iterative process may be performed for a number of desired profitability values (e.g., 1%, 2%, and 3%).

At 802, a trial loan spread for the additional mortgage loan is determined. A resulting profitability of the additional loan is then computed by the real time pricing server 900 based on the trial spread at 804.

If the resulting profitability is within a predetermined range of the desired profitability for additional loan at 806, the trial loan spread is stored and output to a user at 808 (e.g., via the user terminal 10).

If the resulting profitability is not within the predetermined range of the desired profitability at 806, the trial loan spread is adjusted at 810 and the process continues at 804. For example, the real time pricing server 900 may adjust the trial loan spread based on a duration of the additional mortgage loan and a version of Newton's method until the resulting profitability converges with the desired profitability.

In this case, the duration of the additional loan may be calculated and a basis points change per percentage point (i.e., based on the reciprocal of the duration of the additional loan) may be used to determine a tolerance (i.e., the predetermined range in step 806) and/or an estimated adjustment to the trial loan spread. According to one embodiment, the following formula is used to compute the adjusted trial loan spread:

$$\frac{\Delta P}{P} = -D\Delta Y$$

Or, rearranged:

$$\frac{\Delta P}{P} \times \frac{1}{-D} = \Delta Y$$

Where "ΔP/P" equals (the trial proceeds–the target proceeds)/(collateral balance), "D" is the duration of the additional loan (e.g., as computed by a function library), and "ΔY" is the change in the trial loan spread.

For example, if the trial spread is 511,090, then trial proceeds of 827,303,862 and target proceeds of 826,565,000 may be determined. The resulting difference (i.e., "ΔP") would then be 738,862. Given a collateral balance of 806,500,000 (i.e., representing the original portfolio plus the additional mortgage loan) then "ΔP/P" would equal 0.0916%. As described above, the duration of the additional loan was 6.34. Thus, "ΔY" may be computed to be −0.0145% and the trial spread must be reduced to increase proceeds.

For increased tolerances (i.e., a smaller predetermined range in step 806), more sophisticated approaches may be required to reach the desired profitability values. In addition, the Secant method (e.g., using the initial spread and the trial spread to refine the next estimated spread) may be used to converge even with a significant amount of negative convexity (e.g., price capped bonds). Similarly, any root finding method for a non-linear equation may be used in accordance with the present invention.

Real Time Pricing Server

Figure 9:
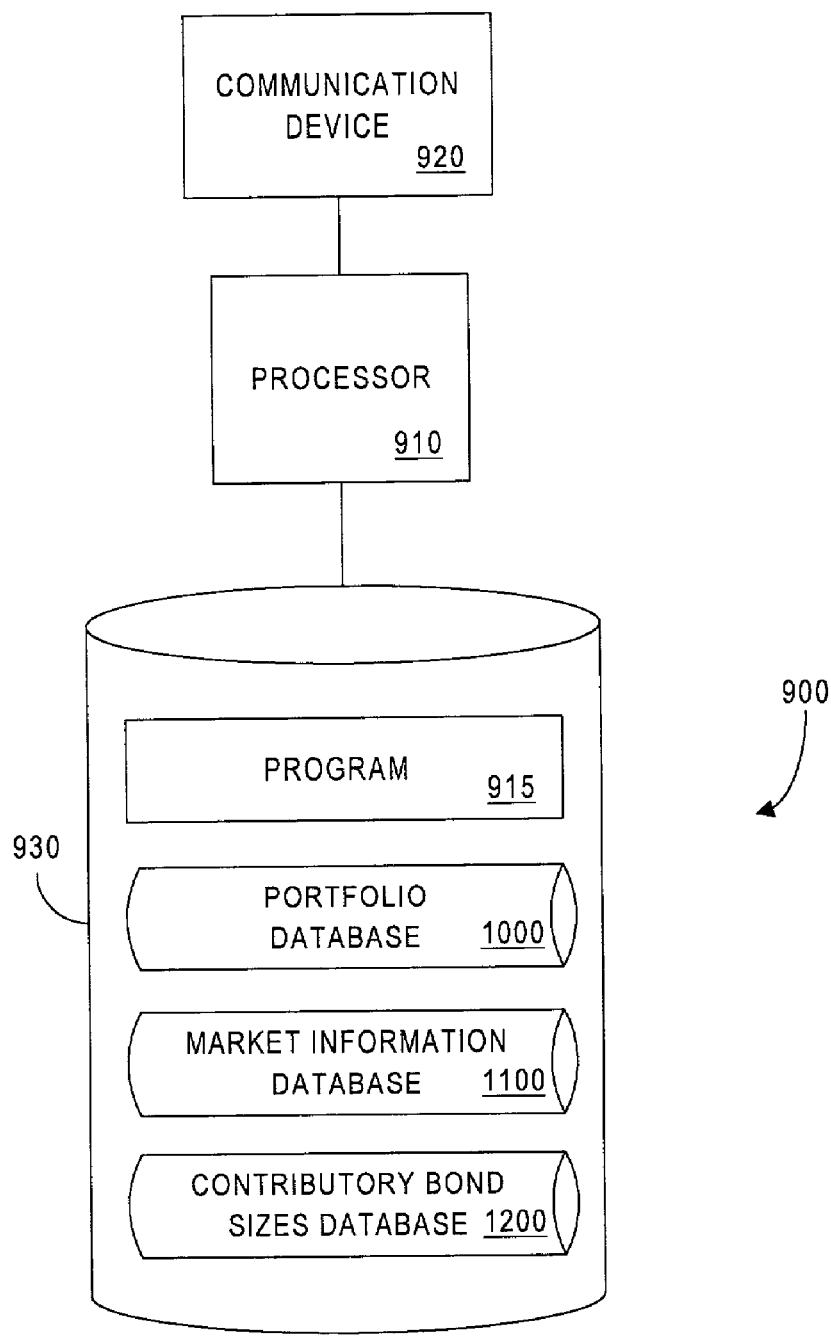
FIG. 9 is a block diagram overview of a real time pricing server according to an embodiment of the present invention.

FIG. 9 illustrates a real time pricing server 900 that is descriptive of the device shown, for example, in FIG. 1 according to some embodiments of the present invention. The real time pricing server 900 includes a processor 910, such as one or more INTEL® Pentium® processors. The processor 910 communicates with other devices, such as one or more user terminals 10, via a communication device 920.

The processor 910 is also in communication with a storage device 930. The storage device 930 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 930 stores a program 915 for controlling the processor 910. The processor 910 performs instructions of the program 915, and thereby operates in accordance with the present invention. For example, the processor 910 may determine base information associated with a CMBS portfolio having a plurality of mortgage loans. The processor 910 may also determine information associated with an additional mortgage loan to be added to the portfolio and calculate a loan spread for the additional mortgage loan in accordance with a contribution of the additional mortgage loan to the portfolio.

Figure 12:
FIG. 12 is a tabular representation of a portion of a contributory bond sizes database according to an embodiment of the present invention.

As shown in FIG. 9, the storage device 930 also stores a portfolio database 1000 (described with respect to FIG. 10), a market information database 1100 (described with respect to FIG. 11), and a contributory bond sizes database 1200 (described with respect to FIG. 12). Examples of databases that may be used in connection with the real time pricing server 900 will now be described in detail. The illustrations and accompanying descriptions of the databases presented herein are exemplary, and any number of other database arrangements could be employed besides those suggested by the figures.

Portfolio Database

Referring to FIG. 10, a table represents the portfolio database 1000 that may be stored at the real time pricing server 900 according to an embodiment of the present invention. The table includes entries identifying commercial mortgage loans associated with a CMBS portfolio. The table also defines fields 1002, 1004 for each of the entries. The fields specify: a mortgage loan identifier 1002 and a mortgage loan status 1004.

The mortgage loan identifier 1002 may be, for example, an alphanumeric code associated with a particular commercial mortgage loan. The mortgage loan status 1004 indicates whether the loan is part of an "existing" portfolio (i.e., is already in a pipeline to be bundled into a CMBS portfolio) or is an "additional" loan to be added to the portfolio.

Market Information Database

Referring to FIG. 11, a table represents the market information database 1100 that may be stored at the real time pricing server 900 according to an embodiment of the present invention. The table includes entries identifying information associated with an additional mortgage loan to be added to a CMBS portfolio. The table also defines fields 1102, 1104, 1106 for each of the entries. The fields specify: a market information identifier 1102, a market information description 1104, and market information 1106. The information in the market information database 1100 may be created and updated, for example, based on information received from a user terminal 10 (e.g., via the input display 400 described with respect to FIG. 4).

The market information identifier 1102 may be, for example, an alphanumeric code associated with a particular item of information and may be based on the mortgage loan identifier 1002 of the additional mortgage loan. The market information description 1104 describes the item and the market information 1106 provides one or more values for the item. For example, as illustrated by the four entry in FIG. 11, the current LIBOR rates associated with the additional mortgage loan are 6.18% (one month) and 6.28% (three months).

Contributory Bond Sizes Database

Referring to FIG. 12, a table represents the contributory bond sizes database 1200 that may be stored at the real time pricing server 900 according to an embodiment of the present invention. The table includes entries identifying property types that may be associated with a commercial mortgage loan. The table also defines fields 1202, 1204, 1206, 1208 for each of the entries. The fields specify: a property type 1202, a Debt Service Coverage Ratio (DSCR) 1204, terms to computer 1206, and credit rating categories and sizes 1208. The information in the contributory bond sizes database 1200 may be created and updated, for example, based on bonds that could currently be sold in the capital market (e.g., an estimate of how an individual loan having certain characteristics would be rated).

The property type 1202 indicates the type of property associated with a loan (e.g., an "anchored retail" or an "industrial" property). For each type of property, credit rating categories and sizes 1208 are defined for various DSCR 1204 (e.g., ranges of DSCR values). Note that the values illustrated in FIG. 12 are for illustration purposes only (e.g., the sum of the category sizes for a given property type 1202 may equal "100" in an actual contributory bond sizes database 1200). According to some embodiments, other types of risk parameters may be stored in the contributory bond sizes database instead of, or in addition to, the DSCR 1204 (e.g., loan to value information). The terms to compute 1206 may indicate, for example, that a particular property type is associated with a 5, 7, and 10 year term and a 30 year amortization.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although the output display 500 illustrate in FIG. 5 gives a number of different loan spreads for a number of different profitability targets, other types of output displays may be provided as well. For example, an output display may be associated with a single profitability target (e.g., 1.25%). In this case, the output display may be a matrix or table that provides appropriate loan spreads (i.e., loan spreads that will result in the desired profitability) for various property types, DSCR values, loan to value information, term periods, and/or cap rates. As a result, a single display may be provided to users who are considering a number of different mortgage loans that might be added to the portfolio.

Figure 13:
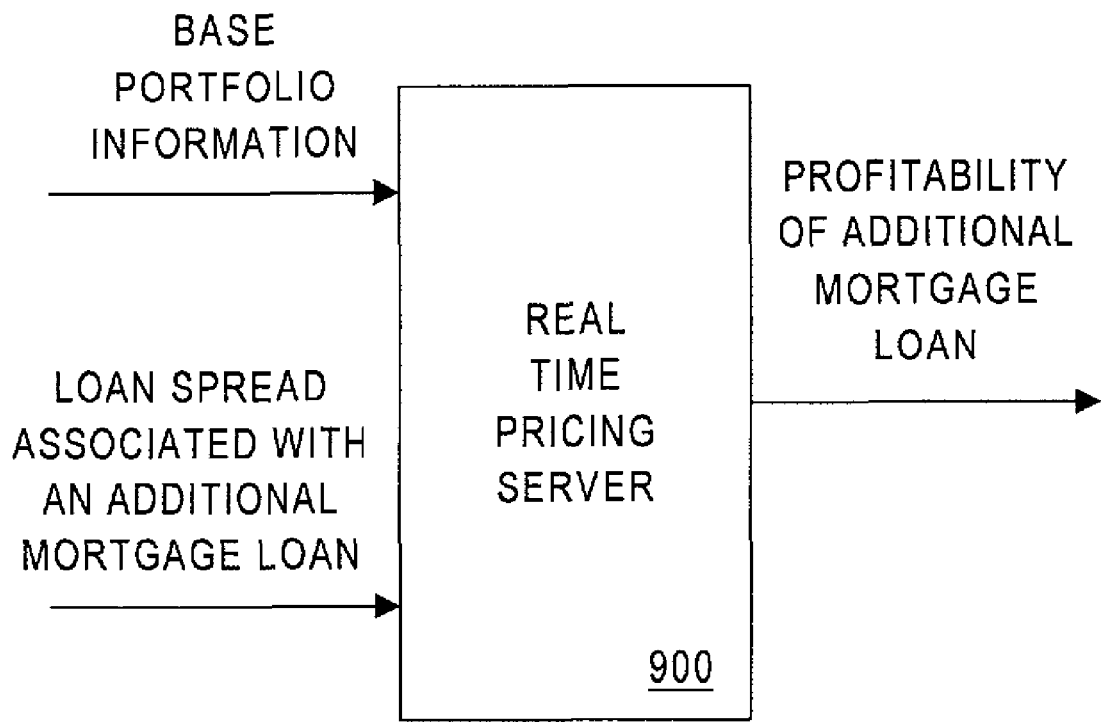
FIG. 13 is an information flow diagram according to another embodiment of the present invention.
Figure 14:
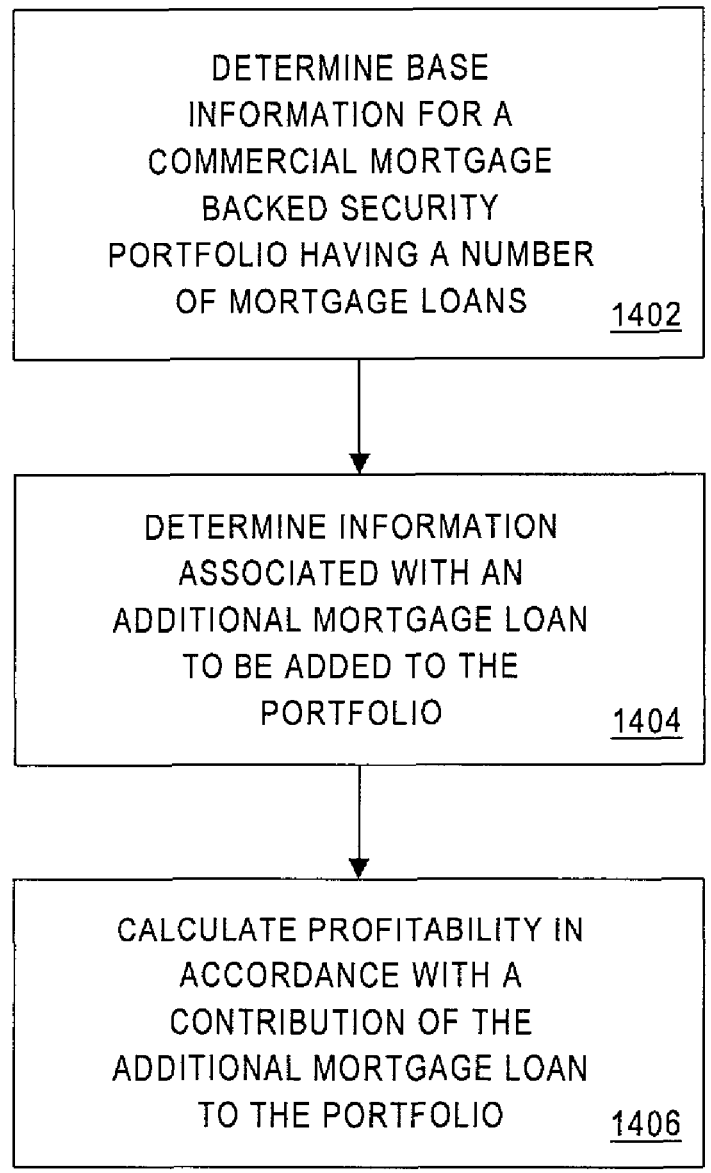
FIG. 14 is a flow chart of a method according to the embodiment illustrated in FIG. 13.

Embodiments of the present invention have been described with respect to the calculation of a loan spread based on a desired profitability associated with an addition mortgage loan. FIG. 13 is an information flow diagram according to another embodiment of the present invention. In this case, the real time pricing server 900 instead calculates the profitability of the additional mortgage loan in accordance with base information and a desired loan spread FIG. 14 is a flow chart of a method according to the embodiment illustrated in FIG. 13. As before, base information associated with the portfolio is determined at 1402 and information associated with an additional mortgage loan to be added to the portfolio is determined at 1404 (e.g., a desired loan spread). At 1406, the real time pricing server calculates a profitability of the additional mortgage loan in accordance with a contribution of the additional mortgage loan to the portfolio. Note that this calculation may not need to be an iterative process.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method, comprising:

retrieving base information of the portfolio from a database by a real time pricing server;

receiving from a user terminal information associated with an additional mortgage loan by the real time pricing server wherein the information comprises at least one credit rating category and at least one profitability value;

determining by the real time pricing server a category size of the at least one credit rating category as a percentage of total loans of the portfolio;

calculating by the real time pricing server a trial loan spread of the additional mortgage loan by the real time credit server in accordance with a contribution of the additional loan to the portfolio;

receiving profitability of the portfolio by the real time pricing server;

calculating by the real time pricing server a profitability of the portfolio with the additional mortgage loan using the trial loan spread wherein the calculating further comprises determining the trial loan spread using the equation "delta$P/P$" $= -D*$delta$Y$, where delta$P/P$ equals (the trial proceeds–the target proceeds)/(collateral balance), "$D$" is the duration of the additional mortgage loan, and "delta$Y$" is the change in the trial loan spread;

determining by the real time pricing server profitability of the additional mortgage loan by subtracting original portfolio profitability from profitability of the portfolio with the additional mortgage loan;

comparing by the real time pricing server profitability of the additional mortgage loan to the at least one profitability value; and based on the comparing, storing the trial loan spread information and transmitting the trial spread loan value to the user terminal by the real time pricing server.

2. The method of claim 1, wherein a determination of category sizes for the additional mortgage loan is based on at least one of: (i) a property type, (ii) a risk value, (iii) debt service coverage ratio information, or (iv) loan to value information.

3. The method of claim 1, further comprising:

adding the category size for the additional mortgage loan to the current category size to determine a combined category size for each credit rating category.

4. The method of claim 3, further comprising:

determining an original profitability of the portfolio;

calculating a combined profitability of the portfolio and the additional mortgage loan based on the combined category sizes; and subtracting the original profitability from the combined profitability to determine a profitability of the additional mortgage loan.

5. The method of claim 1, wherein the information associated with the additional mortgage loan includes a desired profitability of the additional mortgage loan.

6. The method of claim 5, wherein said calculation of the loan spread is an iterative process.

7. The method of claim 6, wherein the iterative process includes:

determining a trial loan spread for the additional mortgage loan;

computing a resulting profitability based on the trial spread; and adjusting the trial loan spread, wherein said computing and adjusting are repeated until the resulting profitability is within a predetermined range of the desired profitability.

8. The method of claim 7, wherein said adjusting is based on a duration of the additional mortgage loan.

9. The method of claim 8, wherein said adjusting comprises:

determining an original duration of the portfolio;

calculating a combined duration of the portfolio and the additional mortgage loan; and subtracting the original duration from the combined duration to determine the duration of the additional mortgage loan.

10. The method of claim 5, wherein the method is performed for a plurality of desired profitability values to determine a plurality of loan spread values.

11. The method of claim 1, wherein said calculating is performed for a plurality of loan term periods.

12. The method of claim 1, wherein the base information includes at least one of: (i) balance information, (ii) loan rate information, (iii) loan term information, (iv) remaining term information, (v) amortization term information, (vi) servicing fee information, (vii) payment basis information, (viii) payment basis servicing fee information, or (ix) calculation of interest reserve information.

13. The method of claim 1, wherein the information associated with the additional mortgage loan includes at least one of: (i) treasury information, (ii) swap information, (iii) credit rating category spread information, (iv) credit rating category size information, (v) price cap information, (vi) coupon information, (vii) yield information, (viii) total flat bond proceed information, (ix) collateral balance information, or (x) deal duration information.

14. The method of claim 1, wherein said calculating is performed via a substantially real-time pricing application.

15. The method of claim 14, wherein said calculating is further performed utilizing a function library adapted to generate loan and/or commercial mortgage backed securities cash flows.

16. The method of claim 1, wherein the contribution of the additional mortgage is calculated via a method of subtraction process.

17. The method of claim 1, wherein the contribution of the additional mortgage loan is calculated via at least one of: (i) a weighted average contributed loan size, (ii) a duration, (iii) a Newton's method process, (iv) a Secant method process, or (v) a root finding method for a non-linear equation.

18. The method of claim 1, further comprising:
generating, based on said calculating, individual loan pricing outputs expressed as spread values in accordance with profitability targets.

19. An apparatus, comprising: a processor; and
a storage device in communication with said processor and storing instructions which when executed by said processor cause said processor to execute the steps of:
retrieving base information of the portfolio from a database;
receiving from a user terminal information associated with an additional mortgage loan wherein the information comprises at least one credit rating category and at least one profitability value;
determining a category size of the at least one credit rating category as a percentage of total loans of the portfolio;
calculating a trial loan spread for the additional mortgage loan in accordance with a contribution of the additional mortgage loan to the portfolio;
receiving profitability of the portfolio;
calculating a profitability of the portfolio with the additional mortgage loan using the trial loan spread wherein the calculating further comprises determining the trial loan spread using the equation "delta$P/P$"$=-D*$delta$Y$, where delta$P/P$ equals (the trial proceeds−the target proceeds)/(collateral balance), "$D$" is the duration of the additional mortgage loan, and "delta$Y$" is the change in the trial loan spread;

determining profitability of the additional mortgage loan by subtracting original portfolio profitability from profitability of the portfolio with the additional mortgage loan;
comparing profitability of the additional mortgage loan to the at least one profitability value; and
based on the comparing, storing the trial loan spread information and transmitting the trial spread loan value to the user terminal.

20. The apparatus of claim 19, wherein the portfolio is associated with a plurality of credit rating categories, each credit rating category being associated with a current category size, and wherein the loan spread calculation includes determining, for the additional mortgage loan, a category size for each credit rating category, and wherein said storage device further stores at least one of: (i) a portfolio database, (ii) a market information database, or (iii) a contributory bond sizes database.

21. The apparatus of claim 20, further comprising:
a communication device coupled to said processor and adapted to communicate with at least one of: (i) a user terminal, or (ii) a real time pricing server.

22. A computer-readable medium storing instructions adapted to be executed by a processor to perform a method of facilitating analysis of a commercial mortgage backed security portfolio associated with a plurality of mortgage loans, said method comprising:
determining base information associated with the portfolio;
determining information associated with an additional mortgage loan to be added to the portfolio; and
calculating a loan spread for the additional mortgage loan in accordance with a contribution of the additional mortgage loan to the portfolio;
wherein the portfolio is associated with a plurality of credit rating categories, each of said credit rating categories denoted by a respective letter grade in a letter grade credit rating system, each credit rating category being associated with a current category size, and wherein said calculating includes:
determining, for the additional mortgage loan, a category size for each credit rating category, each said category size for the additional mortgage loan expressed as a percentage of a total loan;
wherein said loan spread is calculated in accordance with an indication from a user as to whether a particular one of said credit rating categories is to be calculated.

* * * * *